Nov. 3, 1959
E. G. HILL
2,911,263
BOOSTER BRAKE MECHANISM
Filed Jan. 30, 1956
5 Sheets—Sheet 5
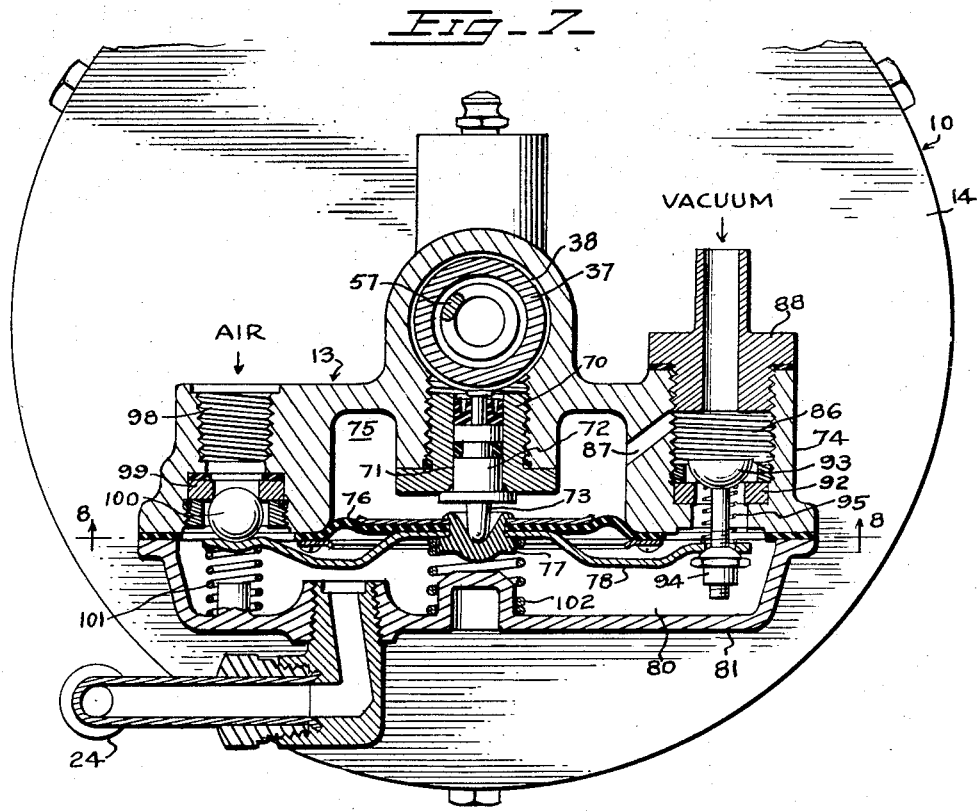
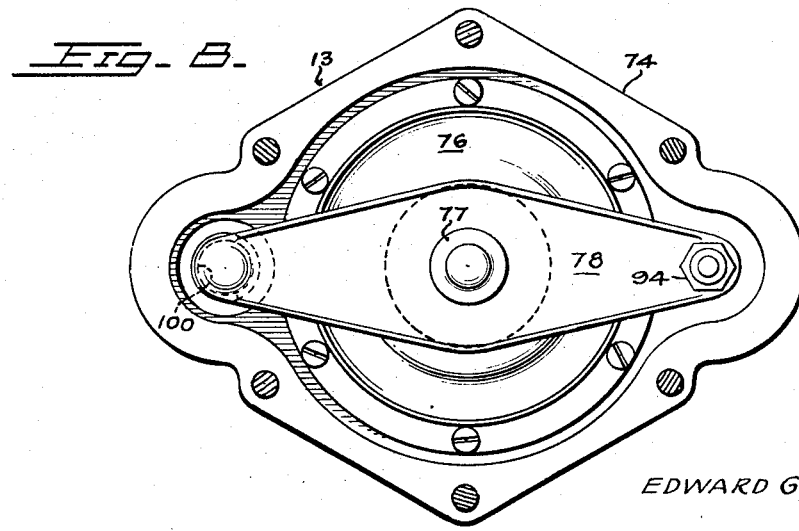
INVENTOR.
EDWARD GOVAN HILL
BY John F. Phillips
ATTORNEY

United States Patent Office 2,911,263
Patented Nov. 3, 1959

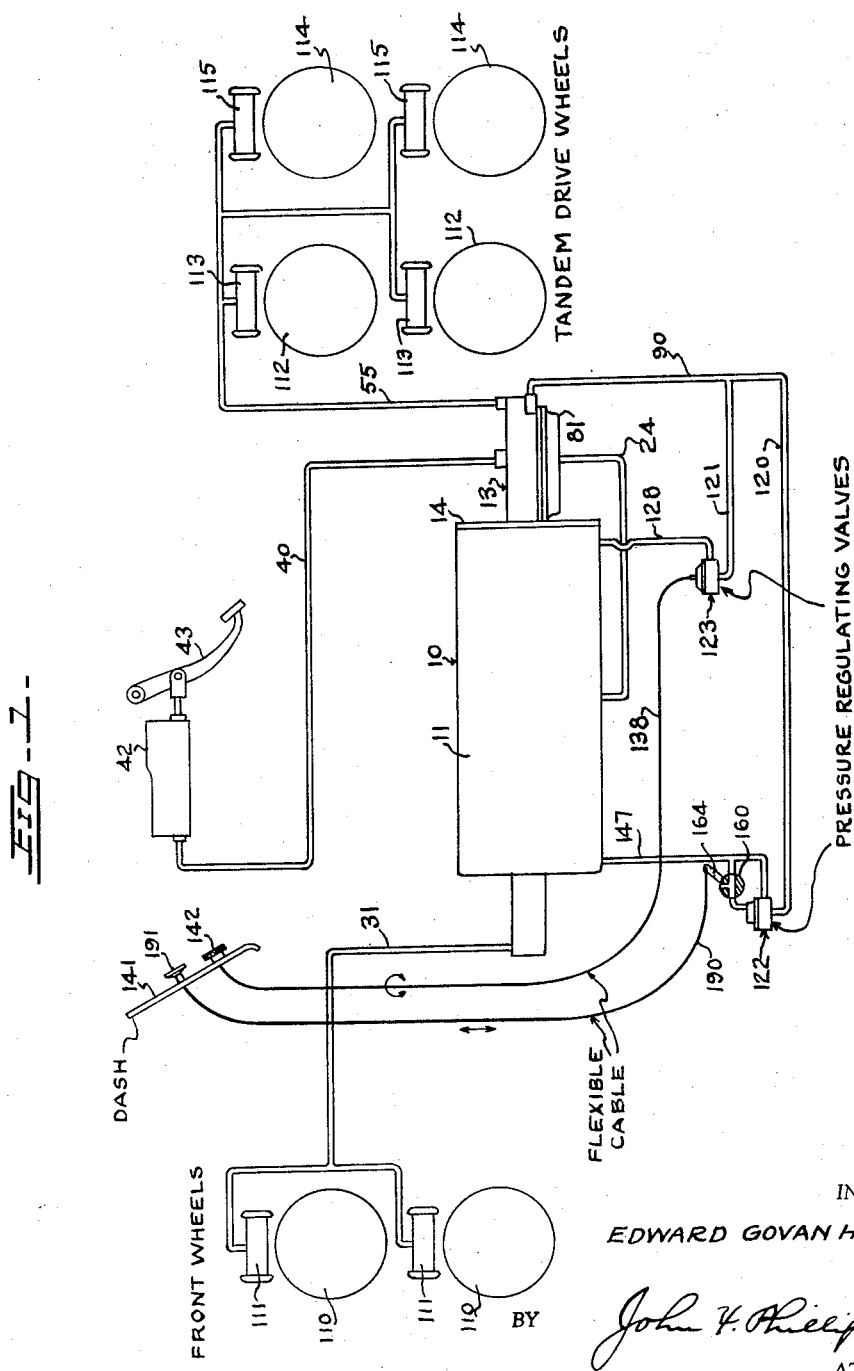

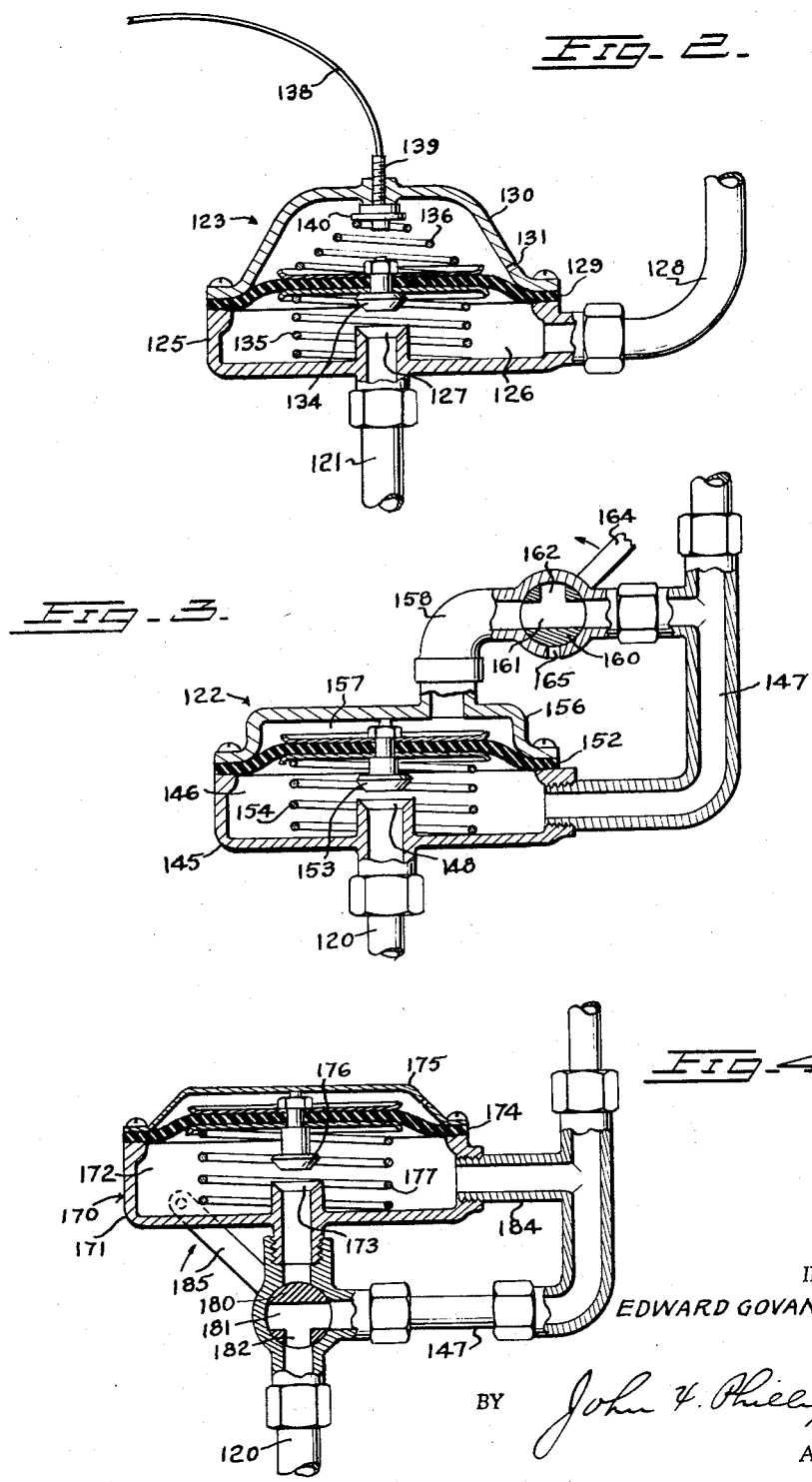

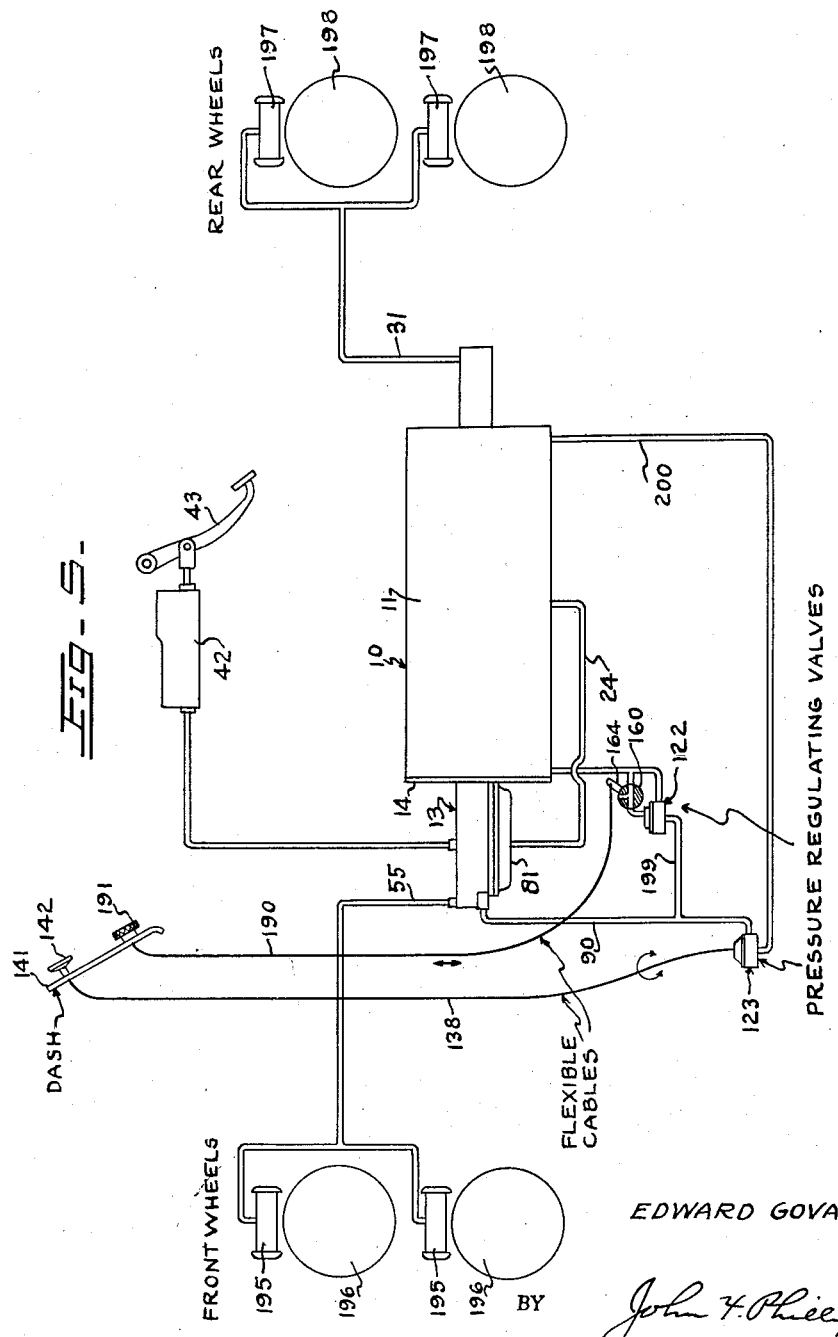

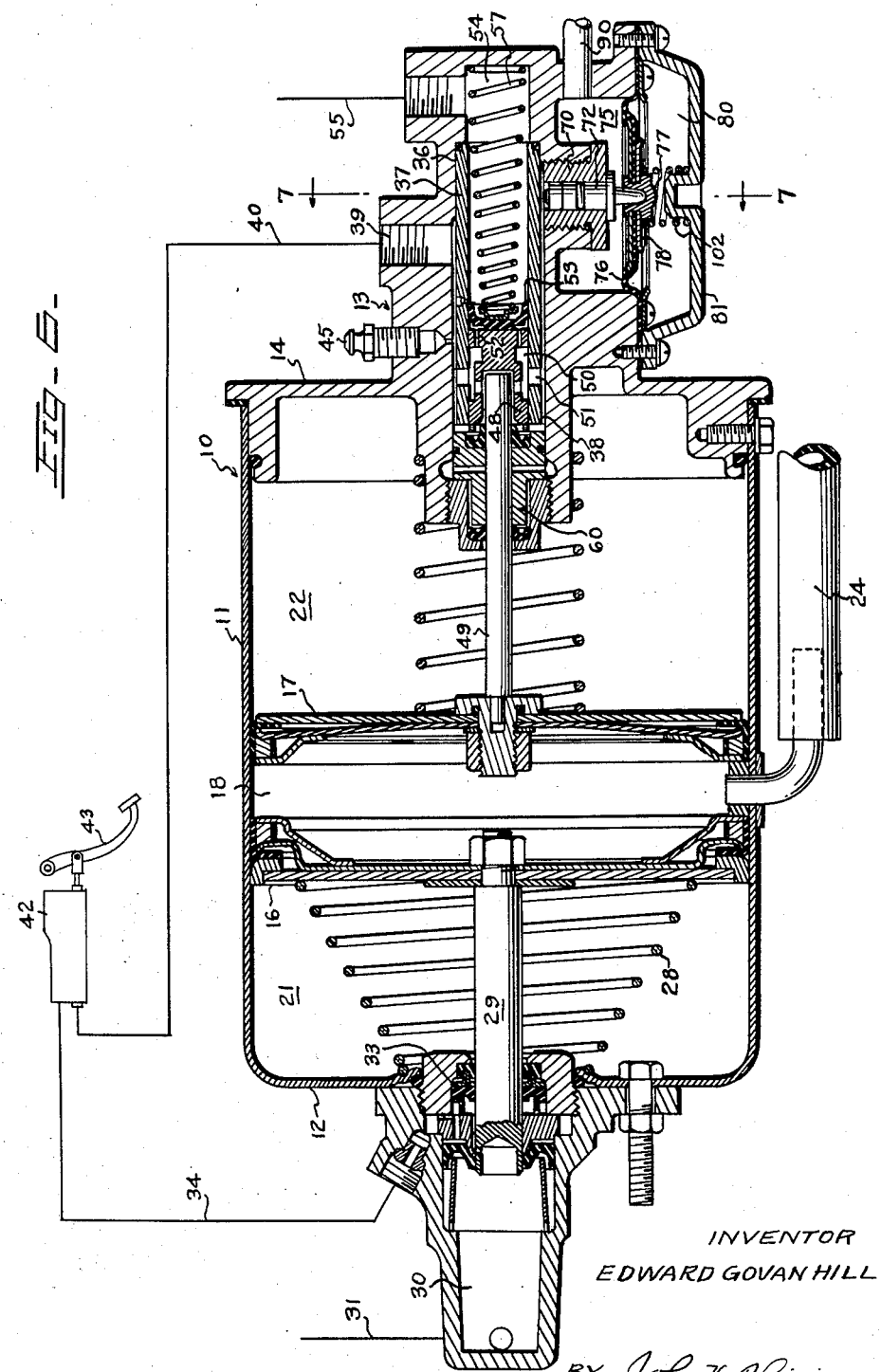

2,911,263

BOOSTER BRAKE MECHANISM

Edward Govan Hill, Birmingham, Mich., assignor to Kelsey-Hayes Company, a corporation of Delaware Application January 30, 1956, Serial No. 562,247

8 Claims. (Cl. 303—6)

This invention relates to a booster brake mechanism and more particularly to a manually controllable booster brake system for motor vehicles and especially trucks.

There are conditions under which the limitation of braking forces to certain wheels of a motor truck is advisable. For example, in the case of heavy dual drive wheel trucks, the four wheel cylinders associated with the drive wheels provide ample total braking action when the truck is traveling relatively slowly. If, under such conditions, the highway is slippery, it is sometimes highly desirable to greatly limit the application of braking forces to the front wheels of the vehicle to prevent the locking of the front wheels with consequent loss of steering control of the vehicle.

It is also desirable to limit braking action to the rear wheels of a four wheel truck under some conditions. For example, in the case of light delivery trucks, it is necessary to provide ample maximum braking at the rear wheels of the vehicle in order to decelerate the vehicle when it is heavily loaded. Such breaking forces, when the vehicle is running light, are greatly in excess of what is required, and this actually in a number of cases has caused serious accidents due to the locking and sliding of the rear wheels when the brakes are applied with substantial force.

An important object of the present invention is to provide a novel booster brake system, particularly for trucks, wherein the operator is enabled to limit the braking forces to one or more sets of wheels through the operation of means accessible to him in the driver's compartment of the truck, thus rendering the operation of the braking system much safer under certain driving conditions.

A further object is to provide such a system wherein pressure control valves are employed for limiting the application of braking energy to one or all sets of the vehicle wheels under the control of the driver, and wherein the pressure control valves may be of several different types to provide pre-selectively for minimum or maximum braking at any set of wheels or for the graduated adjustment of the application of braking forces to any set of wheels of the truck.

A further object is to provide a system of the character referred to which employs in combination therewith a double-ended or similar brake booster motor having simultaneously but separately energizable motor units for applying the front and rear brakes of the vehicle, and to provide means under the control of the operator for limiting the energization of either or both motor units under predetermined operating conditions.

A further object is to provide such a system wherein a single valve mechanism energizes the dual or double-ended motor and is operable by fluid displaced from a pedal operable master cylinder, and wherein hydraulic forces generated by the pedal operable master cylinder are utilized for assisting in the application of braking forces to the wheel cylinders of tandem axle trucks while the other motor unit is employed solely for applying the front wheel brakes, whereby the operator, by pedal pressure assisted by one of the motor units, can apply very substantial braking forces to the brake cylinders of the tandem driving wheels of the truck.

A further object is to provide a system of the character just referred to having means under the control of the operator for limiting the application of braking forces to the tandem driving wheels when the vehicle is running light, and for limiting the application of hydraulic brake applying forces to the front wheels when the truck is traveling on a slippery highway.

Other objects and advantages of the invention will become apparent during the course of the following description.

In the drawings I have shown two embodiments of the invention. In this showing:

Figure 1 is a diagrammatic view illustrating the system as applied to a dual driving wheel truck;

Figure 2 is a detail axial sectional view through a pressure control valve adapted for use in the system;

Figure 3 is a similar view showing another type of pressure control valve;

Figure 4 is a similar view showing a third type of pressure control valve;

Figure 5 is a diagrammatic view showing the system as applied to a four wheel truck, preferably of the light delivery type;

Figure 6 is an axial sectional view through the booster motor used with the system;

Figure 7 is an enlarged sectional view on line 7—7 of Figure 6; and

Figure 8 is a section on line 8—8 of Figure 7.

The booster motor is important in the present combination but forms no part per se of the present invention, being disclosed and claimed in the copending application of David T. Ayers, Jr., and Edward Govan Hill, Serial No. 474,804, filed December 13, 1954. The control valve mechanism is disclosed and claimed in the copending application of Jeannot G. Ingres, Serial No. 455,647, filed September 13, 1954.

Referring to Figure 6, a double-ended booster motor, preferably employed with the system, is indicated as a whole by the numeral 10 and comprises a cylinder 11 having an integral head 12 at one end thereof. The other end of the motor is provided with a die-cast body 13 having an annular portion 14 forming a head for the adjacent end of the motor.

The cylinder 11 is provided therein with a pair of pressure responsive units, shown in the present instance as a pair of pistons 16 and 17 forming therebetween a variable pressure chamber 18. At the remote sides of the pistons is formed a pair of vacuum chambers 21 and 22. The valve mechanism shown in Figures 6, 7 and 8 controls pressures in the chamber 18 through the medium of a main conduit 24 (Figures 1, 6 and 7). When pressures in the chambers 18, 21 and 22 are equal, all of the parts will be in their off positions shown in Figure 6. When pressure is raised in the chamber 18, the pistons 16 and 17 will be moved away from each other to perform their intended functions.

The piston 16 is biased to its off position by a spring 28 and carries a plunger 29 operable in a hydraulic chamber 30 to displace fluid through a conventional line 31 to supply brake fluid to wheel cylinders referred to below, these wheel cylinders depending upon the use to which the system is put. The plunger 29 operates in suitable bearing and sealing means 33, and replenishing fluid may be supplied from a line 34, through the bearing and sealing means, to the chamber 30 when the parts are in their off positions.

The body 13 has a bore 36 in which is arranged a sleeve 37 surrounded between its ends by an annular fluid space 38 having an inlet opening 39 supplied with fluid through a hydraulic line 40 connected to a conventional master cylinder 42 provided with a conventional operating pedal 43. The fluid replenishing line 34 is preferably connected to the reservoir of the conventional master cylinder 42 in any suitable manner (not shown). The annular space 38 is provided with a bleed plug 45 for evacuating air from the system, such plug being conventional.

The sleeve 37 forms a cylinder in which is operative a fluid displacing plunger 48 adapted to be actuated by a piston rod 49 connected to the piston 17. A space 50 around the plunger 48 communicates through a port 51 with the annular space 38 to receive fluid from the master cylinder 42 when the latter is operated. Such fluid can flow through ports 52 in the end of the plunger 48 and thence around the lip of a cup 53, engaging the end of the plunger 48. Such fluid flows into a hydraulic chamber 54 having an outlet line 55 for connection with certain wheel cylinders of the vehicle according to the use of the system. A spring 57 biases the plunger 48 to its normal off position.

The piston rod 49 extends through suitable bearing means 60 mounted in the inner end of the body 13, and it will be noted that the piston rod 49 extends into an axial recess in the plunger 48 to engage and move the latter when the piston 17 is operated. Master cylinder pressures delivered behind the plunger 48 assist the piston 17 in generating pressures in the hydraulic chamber 54 during operation of the apparatus.

As stated, the valve mechanism for the dual booster motor is shown in Figures 6, 7 and 8, and particularly in the latter two figures. The valve mechanism per se forms no part of the present invention but is described and claimed in the copending application of Jeannot G. Ingres, Serial No. 454,647, filed September 13, 1954.

Referring to Figure 7, a nut 70 is threaded into the body 13 and forms a cylinder 71 in which is movable a pressure operable plunger 72. The upper end of the cylinder 71 is in fixed communication with the annular space 38 whereby the plunger 72 is movable downwardly as viewed in Figure 7 by master cylinder generated pressures. An axially projecting operating pin 73 is formed on the lower end of the plunger 72 for a purpose to be described.

The body 13 is provided with an annular depending portion 74 defining therein a vacuum chamber 75 sealed at the bottom thereof by a reaction diaphragm 76. Such diaphragm is fixed to a thimble 77 having an upper axial recess receiving the pin 73. The thimble 77 serves to secure to the diaphragm 76 the central portion of a valve operating lever 78. This lever is arranged in a chamber 80 formed within a cap 81 secured to the bottom of the annular wall 74 of the body 13 and communicating with the pipe 24 as shown in Figure 7.

Radially outwardly of the chamber 75, the body 13 is provided with a vacuum chamber 86 in fixed communication with the chamber 75 through a passage 87. A fitting 88 is tapped into the upper end of the chamber 86 for connecting the latter with a line leading to a suitable source of vacuum (not shown). It will be apparent that vacuum is always present in the chamber 75, and this chamber is in fixed communication with a conduit 90 from which divided lines, referred to below, lead to the motor chambers 21 and 22 to control the degree of vacuum therein.

A valve seat 92 is arranged in the bottom of the vacuum chamber 86 and is engageable by a vacuum valve 93 the stem of which projects through the adjacent end of the lever 78 and has a nut 94 threaded on the lower end thereof for adjustment purposes. A spring 95 maintains the valve 93 at its upper limit of movement, and this valve is normally open as shown in Figure 7. Normally, therefore, the chamber 86 communicates with the chamber 80, which in turn communicates with the motor chamber 18 through the pipe 24. Normally vacuum is therefore present in the chamber 18.

The body 13 is provided diametrically opposite the vacuum chamber 86 with an air inlet 98 in the bottom of which is arranged a valve seat 99 normally engaged by an upwardly closing ball valve 100. This ball engages the top face of the adjacent end of the lever 78 and the latter is urged upwardly by a spring 101. Centrally of its length, a biasing spring 102 engages the lever 78 to urge such portion of the lever upwardly to its normal position.

The booster mechanism described above is illustrated in Figure 1 in conjunction with a dual drive wheel truck. Such truck is provided with front wheels indicated generally by the numeral 110 and having wheel cylinders 111 associated with the brake drums thereof. In this instance, the hydraulic line 31 (Figure 6) is connected to the wheel cylinders 111. A truck of this character is provided with dual drive wheels, the forward of which are diagrammatically illustrated and indicated by the numeral 112, having wheel cylinders 113 associated with the brake drums thereof. The rear tandem wheels 114 have associated with the brake drums thereof wheel cylinders 115. The hydraulic line 55 (Figure 1) is connected to all of the wheel cylinders 113 and 115.

The line 90 (Figure 6) is in constant communication with the chamber 75 in which vacuum is always present. It will become apparent that so far as maintenance of vacuum in the line 90 is concerned, the chamber 75 is unnecessary since the line 90 may be directly connected to the source of vacuum. The arrangement shown in Figures 6 and 7 is preferred, however, in the interest of simplicity and in the interest of retaining the use of the diaphragm 76 for providing elastic fluid reactions against the brake pedal 43, particularly during initial brake operations.

The vacuum line 90 (Figure 1) is shown as being provided with two branches 120 and 121 respectively provided with pressure regulating valves indicated as a whole by the numerals 122 and 123. These valves in the present instance have been shown as being of different types further described in detail below, but it will become apparent that any single type of pressure regulating valve may be used in both lines 120 and 121, although it is preferred that an adjustable pressure regulating valve 123 be provided in the line 121 because of the much more flexible results which can be obtained.

The pressure regulating valve 123 is shown in detail in Figure 2 of the drawings and comprises a body 125 having a chamber 126 therein with which the line 121 communicates through a valve seat 127. The chamber 126 communicates through a line 128 (Figures 1 and 2) with the motor chamber 22.

The chamber 126 is closed at its top by a diaphragm 129 clamped in position by a cap member 130 vented to the atmosphere as at 131. The diaphragm 129 carries a valve 134 engageable with the seat 127 but normally arranged in open position as shown in Figure 2. The diaphragm 129 is urged upwardly by a spring 135 and within the cap 130 is a spring 136 which is normally inoperative but is adapted to be loaded to partially overcome the loading of the spring 135.

A flexible cable 138 is connected to a stem 139 threaded in the cap 130 and having at its lower end a seat 140 engaged by the upper end of the spring 136. The flexible cable 138 (Figure 1) leads to the dash 141 of the vehicle or to any other suitable point in the operator's compartment so as to be readily accessible to the operator. A rotating knob 142 on the dash 141 is connected to the cable 138 and the latter is adapted to be rotated in opposite directions, as indicated by the arrow in Figure 1, to adjust the loading of the spring 136.

The pressure regulating valve 122 is shown in Figure 3 of the drawings. This valve comprises a body 145 having a chamber 146 therein communicating through a line 147 with the motor chamber 21. The branch line 120 (Figure 1) communicates with the chamber 146 through a valve seat 148.

The top of the chamber 146 is closed by a flexible diaphragm 152 carrying a valve 153 engageable with the seat 148 but normally arranged in open position as shown in Figure 3. A spring 154 in the chamber 146 biases the diaphragm 152 upwardly to tend to maintain the valve 153 in normal position.

The diaphragm 152 is clamped in position by an upper casing 156 defining a chamber 157 above the diaphragm. Such chamber communicates through a line 158 with the line 147 as shown in Figure 3. In the line 158 is arranged a three-way valve 160 having a diametrical passage 161 normally arranged as shown in Figure 3 to maintain communication between the line 147 and the chamber 157. A branch passage 162 in the three-way valve is normally closed as shown in Figure 3. However, when the three-way valve 160 is turned 90° counterclockwise by a handle 164, the passage 162 communicates with the chamber 157 and the latter will be cut off from the line 147 while the passage 161 will be vented to the atmosphere through a port 165. Air pressures are normally balanced in the chambers 146 and 157, and the turning of the valve 160 in the manner stated admits atmospheric pressure to the chamber 157. Such pressure acting downwardly on the diaphragm partially overcomes the loading of the spring 154 and determines the degree of vacuum in the chamber 146 necessary to close the valve 153 when full vacuum is not desired in the motor chamber 21.

A further modified type of pressure control valve, as illustrated in Figure 4, may be employed in place of either of the other valves described. Such modified form of pressure control valve is indicated as a whole by the numeral 170 and comprises a body 171 having a pressure chamber 172 therein. This chamber communicates through a valve seat 173 with a line shown in the present instance as the line 120, although it will become apparent that such line may be the line 121. The chamber 172 is closed at its top by a diaphragm 174 clamped in position by a vented cap 175 and carrying a valve 176 engageable with the valve seat 173. A spring 177 biases the diaphragm 174 upwardly as shown in Figure 4.

The line 120 in Figure 4 is shown as being provided with a three-way valve 180 having a diametrical passage 181 normally closed at one end and open at its other end to the line 147 (or the line 128, as the case may be). The three-way valve is further provided with a radial passage 182 open to the line 120. The chamber 172 is connected to the pipe 147 by a branch 184. In the position of the three-way valve shown in Figure 4, full vacuum can be communicated to the chamber 172 to overcome the spring 177 and close the valve 176, but this makes no difference since the line 147 bypasses the valve seat 173 when the three-way valve is in the normal position. When the valve 180 is turned clockwise by its handle 185, the line 147 is cut off from communication with the line 120 except through the chamber 172 in which case a predetermined partial vacuum will tend to close the valve 176 and limit the degree of vacuum in the motor chamber 21.

It will be apparent that either of the valves 122, 123 or 170 may be employed in the system in Figure 1. Where the valve 122 is employed as shown, the handle 164 thereof will be connected to a flexible cable 190 leading to the dash 141 and provided with a push-pull handle 191 through which the handle 164 may be turned. If the valve 170 is employed (Figure 4) in place of the valve 122 in Figure 1, obviously the handle 185 thereof will be connected to the cable 190.

The system shown in Figure 5 is particularly intended for use with four-wheel trucks, and particularly such trucks of the light delivery type in which very substantial overbraking occurs when the vehicle is running light. The motor and valve mechanism employed in Figure 5 is identical with that employed in Figure 1 and illustrated in Figures 6, 7 and 8, except that the motor is reversed with respect to its connections. In this case, the hydraulic line 55 leading from the chamber 54 (Figure 6) is connected to the wheel cylinders 195 for the front wheels 196, while the line 31 from the hydraulic chamber 30 (Figure 6) is connected to the wheel cylinders 197 for the rear or driving wheels 198 of the truck. As before, the fluid line 90 (Figure 6) is provided with two branches respectively indicated as a whole by the numerals 199 and 200, and these lines are respectively connected to the motor chambers 22 and 21. In Figure 5, the two lines 199 and 200 are shown respectively as being provided with the pressure control valves 122 and 123. As stated above, however, the branch lines for the motor chambers 21 and 22 may be selectively provided with valves of the types shown in Figures 2, 3 and 4, but generally speaking, it is preferred that a progressively adjustable pressure regulating valve 123 be employed. The pressure regulating valves shown in Figure 5 are provided with the same flexible operating cables and control knobs therefor associated with the dash of the vehicle, and such elements have been indicated by the same reference numerals as in Figure 1.

*Operation*

The invention has great value as a safety system, particularly in conjunction with the controlling of brake applications in a tandem drive wheel truck, as diagrammatically shown in Figure 1. Normally, the vacuum control valves 122 and 123 in Figure 1 are open as shown in Figures 2 and 3, in which case they are inoperative for controlling the application of the brakes corresponding to the ends of the motor 10 with which they are associated.

The brakes are applied by depressing the pedal 43 to displace fluid through line 40 (Figures 1 and 6) into the chamber 38. Fluid initially flows from the chamber 38 into space 50 (Figure 6), thence through openings 52 around the lip of the cup 50 and into the chamber 54. Fluid thus displaced flows through lines 55 (Figure 1) to the wheel cylinders 113 and 115 of the tandem drive wheels. This displaced fluid takes up play between the brake shoes and brake drums, thus arresting further displacement of fluid in the manner stated and building up a static pressure in the chamber 38. This pressure (Figure 7) acts downwardly against the plunger 72 to apply a force to the lever 78 intermediate the ends thereof. The spring 101 will hold the air valve 100 shut, and initial force applied to the lever 78 will seat the vacuum valve 93 to disconnect chambers 80 and 86 from each other. The right-hand end of the lever 78 in Figure 6 can no longer move downwardly, hence forces applied centrally of the lever will move the left-hand end of the lever downwardly to release the air valve 100. Air thus will flow from the air inlet 98 into the chamber 80.

Air thus admitted into the chamber 80 will flow through pipe 24 into the variable pressure chamber 18 of the motor 10 (Figure 6) to force the pistons 16 and 17 away from each other. The motor pistons thus will start to operate to apply forces to the plungers 29 and 48 to generate pressures in the chambers 30 and 54 respectively. At the same time, pressure built up in the space 50 (Figure 6) by pedal generated forces will be applied against the rear end of the plunger 48 to assist the motor piston 17 in generating pressures in the chamber 54.

With the arrangement shown, it will be apparent that ample hydraulic fluid will be available for applying the brakes associated with the wheel cylinders 113 and 115. Four such cylinders will be required for the tandem drive wheels of the truck. Hydraulic fluid for initially moving the shoes into engagement with the drums will be supplied from the master cylinder 42, and accordingly the plunger 48 need not have a very long stroke for applying the tandem drive wheel brakes since it is largely a matter of building up static pressures in the system for the tandem drive wheels when the motor 10 becomes energized.

The type of motor shown in Figure 6 is also highly adapted to the use referred to. Obviously it is desired to generate substantial hydraulic pressures in the chamber 54 since this pressure is distributed among four wheel cylinders 113 and 115. All forces generated by the master cylinder 42 by the brake pedal 43 will be expended in assisting the piston 17 in applying the tandem drive wheel brakes. Thus ample pressures are provided for these brakes. The front wheel brakes are applied only up to the capacity of the piston 16 for generating pressure in the chamber 30. The motor 10 may be of such size as to generate the desired maximum pressure in the chamber 30 without enlarging the motor to generate greater pressures in the chamber 54 in view of the fact that all of the operator's foot pressure is utilized for assisting the piston 17 in performing its work.

The preferred form of booster motor shown in Figure 6 is disclosed and claimed in the copending application of David T. Ayers, Jr., and Edward Govan Hill, Serial No. 474,804, filed December 13, 1954. The control valve mechanism is disclosed and claimed in the copending application of Jeannot G. Ingres, Serial No. 455,647, filed September 13, 1954. In accordance with the disclosure of the latter application, the valve mechanism shown in Figure 7 functions to provide a perfect follow-up action of the motor pistons 16 and 17 with the brake pedal 43.

Assuming that the valves 122 and 123 are opened, as stated, under normal operating conditions, full vacuum will be maintained in the motor chambers 21 and 22 (Figure 6) and full brake applications may be effected, the pressures generated in the wheel cylinders 113 and 115 (Figure 1) being limited only by the ability of the driver to apply forces to the pedal 43 to assist the motor piston 17 in generating pressures in the chamber 54 (Figure 6). The returning of the parts to normal position upon releasing of the brake pedal will be apparent and is fully disclosed in the copending applications referred to above.

Assuming that the truck is traveling over a highway the surface conditions of which are such as to render it inadvisable to apply full braking forces to the brake cylinders for the tandem drive wheels, to prevent the locking and sliding of such wheels, the differential pressures applied to the motor piston 17 may be regulated by adjusting the valve mechanism 123 (Figures 1 and 2). By turning the knob 142 clockwise to rotate the cable 138, the stem 139 (Figure 2) may be turned downwardly to increase the loading of the spring 136. Atmospheric pressure normally is present within the cap 130, and full vacuum is present in the chamber 126 beneath the diaphragm. The loading of the spring 135, however, normally is sufficiently great to overcome differential pressures acting on the diaphragm 129, thus maintaining the valve 134 in the open position shown in Figure 2. When the stem 139 is turned downwardly, however, the increased loading of the spring 136 opposes the spring 135, thus reducing the effectiveness of this spring for holding the diaphragm 129 in its upper position. A lower degree of vacuum, for example 8" of mercury, in the chamber 126 then will be sufficient, combined with air pressure in the cap 130 and the pressure of the spring 136 to close the valve 134.

While full vacuum will be trapped in the chamber 22 by the closing of the valve 134, the next operation of the brakes will reduce the volume of the chamber 22 (Figure 6) and thus raise the pressure therein. If this pressure rises above the pressure for which the valve 134 has been adjusted, this valve will be cracked to connect the chamber 126 to the pipe 121. It will be apparent that the vacuum of the source will always be present in the chamber 75 (Figures 6 and 7), and such vacuum always, accordingly, will be present in the pipe 121. The pressure regulating valve in Figure 2, however, functions in the manner described to prevent the utilization of full vacuum in the chamber 22 to the degree desired. This degree readily may be adjusted in accordance with the turning of the knob 142, as will be apparent.

It is also desirable to control the application of hydraulic pressures in the front wheel cylinders 111 under some conditions, particularly when a highway is covered with smooth ice. The locking of the front wheels takes place very easily under such conditions, together with the loss of steering control of the vehicle. Under such conditions, the valve 122 (Figure 1) is adapted to be controlled to limit the effectiveness of the piston 16 of the motor for applying pressures in the front wheel brake lines. Referring to Figure 3, it will be noted that the three-way valve 160 normally opens communication between the pipe 147 and chamber 157, thus balancing pressures above and below the diaphragm 152 so that the spring 154 holds the valve 153 open.

If it is desired to limit energization of the front wheel motor piston 16, the handle 191 (Figure 1) will be pulled to swing the handle 164 90° in a counterclockwise direction as viewed in Figure 3. This cuts off communication between pipes 158 and 147 and opens the former pipe to the atmosphere through port 165. Atmospheric pressure above the diaphragm 152 will then close the valve 153 to prevent the exhaustion of any more air from the motor chamber 21. As in the previous case, a subsequent brake operation will result in movement of the piston 16 to the left in Figure 6 to reduce the capacity of the chamber 21 and thus raise the pressure therein. This pressure of course cannot be raised above the predetermined pressure at which the valve 153 closes, since such rise in pressure in the chamber 146 will result in the cracking of the valve 153 due to the force of the spring 154. When this occurs, some additional air will be exhausted from the chamber 146 and from the line 147 and motor chamber 121 until a predetermined operative pressure upon the diaphragm 152 has been reached, whereupon the valve 153 will again close.

It will be apparent that the pressure regulating valves associated with the two ends of the motor 10 may be identical with either of the forms shown in Figures 2 and 3. If either of these valves is made progressively adjustable, however, it is preferred that this be done with the valve associated with the chamber 22 to provide more accurate compensation for loads carried on the truck.

If desired, the type of valve shown in Figure 4 may be employed, and this valve functions in exactly the same manner, so far as results are concerned, as does the valve shown in Figure 3. The three-way valve 180 may be turned to the position shown in Figure 4 to directly connect pipes 120 and 147, thus bypassing the valve 176. By turning the valve 90° from the position shown in Figure 4, communication between the pipe 120 and the pipe 147 beyond the connection 184 will be dependent upon the chamber 172, in which case the degree of vacuum will determine the closing point of the valve 176. The position of this valve makes no difference in the operation of the device when the three-way valve 180 is in the position shown in Figure 4. This valve may be substituted for either of the valves 122 or 123 in Figure 1.

The present invention also is applicable to lighter four-wheel trucks as shown in Figure 5. Much difficulty has been encountered, particularly with light delivery trucks, for example of one-half ton capacity, because of the ease with which the rear wheels are locked and slide when the truck is running light. Such trucks are used in very large numbers on farms, not only for transporting produce but also as a family car. The rear brakes must be of such capacity as to provide for the necessary rate of deceleration when the truck is loaded, and the brake capacity at the rear wheels is much too great when the truck is running light. A number of accidents have resulted from this fact since great loss of braking results when the rear wheels of the truck are locked when the truck is running light.

In the application of the system to a truck of the character just referred to, it is preferred that the motor 10 be reversed so that pedal forces are added to motor forces in operating the wheel cylinders for the front brakes. The motor may be smaller in such a system, and the relatively heavy constant weight of the vehicle engine makes it advisable to provide for the utilization of brake pedal forces for assisting in applying the front wheel brakes. The rear brakes are applied by pressure from the motor chamber 30 (Figure 6) without assistance by pedal pressures. The force thus provided is ample for a fully loaded light truck but is excessive when the truck is running light.

Accordingly, the system is provided with vacuum regulating valves shown in Figure 5 as being the valves 122 and 123 for respectively controlling the application of the front and rear brakes in the same manner as before. It will be apparent again that any one of the valves shown in Figures 2, 3 and 4 may be used for either the front or rear brakes or the same valve may be employed for controlling each set of brakes. Assuming that the vehicle is running on icy roads and it is desired to preserve to the greatest possible extent the steering maneuverability of the vehicle, the valve 122 will be operated as before to limit energization of the front end of the motor 10, corresponding to the rear end in Figure 6, thus providing for some braking of the front wheels, in fact all of the braking that such wheels can stand. Inasmuch as loads on light trucks are quite variable, it is preferred that the rear wheels at least be controlled by one of the valves 123 shown in Figure 2. This valve may be adjusted for minimum vacuum in the motor chamber 21 when the vehicle is running light, maximum vacuum when the vehicle is fully loaded, and any intermediate vacuum according to any intermediate loads which the vehicle may be carrying.

From the foregoing, it will be apparent that the present system provides a highly flexible controlling of the application of the vehicle brakes and particularly truck brakes. It also will be apparent that the invention is particularly useful in conjunction with tandem drive wheel trucks. In this connection it will be noted that in the event the hydraulic lines to either the front or rear wheel brakes should break, there will be no total loss of braking in the system. Referring to Figure 6 it will be apparent that if the line 31, for example, should break, the piston 16 merely will move to the end of its stroke and stop, but this will not affect differential pressures acting on the piston 17 and the latter will function normally.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. A booster brake mechanism for a motor vehicle having forward and rear sets of wheels each provided with wheel cylinders, a hydraulic chamber connected to the wheel cylinders of each pair of wheels, a hydraulic plunger operable in each hydraulic chamber, a fluid pressure operated booster motor unit having a pair of pressure responsive units each connected to one of said plungers, said booster motor unit having a low pressure chamber at one side of each pressure responsive unit, branch lines each connecting one of said low pressure chambers to a source of low pressure, variable pressure chamber means open to the other sides of said pressure responsive units, a single control valve mechanism connected to sources of relatively high and low pressures and operable for connecting said variable pressure chamber means to said low pressure source, or to the higher pressure source to simultaneously operate both pressure responsive units, and a pressure control valve in one of said branch lines and having a manually operable control element accessible in the driver's compartment of the vehicle and operable to predetermine the minimum pressure in the low pressure chamber connected to said one branch line to determine the effectiveness of the associated pressure responsive unit for developing hydraulic pressures in the associated hydraulic chamber.

2. A mechanism according to claim 1 wherein said control valve mechanism is provided with a low pressure chamber connected to said low pressure source and to which said branch lines are connected, said pressure control valve being arranged in one of said branch lines.

3. A booster brake mechanism for a motor vehicle having forward and rear sets of wheels each provided with wheel cylinders, a hydraulic chamber connected to the wheel cylinders of each pair of wheels, a hydraulic plunger operable in each hydraulic chamber, a fluid pressure operated booster motor unit having a pair of pressure responsive units each connected to one of said plungers, said booster motor unit having a low pressure chamber at one side of each pressure responsive unit, variable pressure chamber means open to the other sides of said pressure responsive units, a single control valve mechanism connected to sources of relatively high and low pressures and connected to determine pressures in all of said motor chambers and operable for connecting said variable pressure chamber means to the higher pressure source to simultaneously operate both pressure responsive units, said control valve mechanism having a low pressure chamber communicating with said low pressure source and communicating through separate lines with the two low pressure chambers of said motor, and an independently operable pressure control valve in each of said separate lines having a manually operable handle connected thereto and accessible in the driver's compartment of the vehicle whereby the minimum pressures in the low pressure chambers of said motor can be separately predetermined to separately predetermine the differential pressures affecting said pressure responsive units.

4. A booster brake mechanism for a vehicle having front and rear sets of wheels each having a wheel cylinder, a hydraulic chamber communicating with the wheel cylinders of each set, a hydraulic plunger operable in each hydraulic chamber, a fluid pressure operated booster motor having therein a pair of pressure responsive units each connected to one of said plungers and forming therebetween a variable pressure chamber, opposite ends of said motor being provided with low pressure chambers, a source of relatively high pressure and a source of relatively low pressure, a control valve mechanism connected to control communication of said variable pressure chamber with said sources, separate lines connecting said low pressure chambers to said low pressure source, and a pressure control valve arranged in one of said separate lines and having manually operable means including a handle arranged to be accessible in the driver's compartment for adjusting said pressure control valve to determine the minimum pressure in the associated low pressure chamber of said motor.

5. A mechanism according to claim 4 provided with a pressure control valve in the other of said separate lines having manually operable means including a handle accessible in the driver's compartment of the vehicle, said handles being independently operable to independently determine the minimum pressures in the respective low pressure chambers of said motor.

6. A mechanism according to claim 4 provided with a pedal operable master cylinder, one of said hydraulic chambers having a space behind the plunger therein connected to said pedal operable master cylinder whereby such plunger will be subjected to master cylinder pressures in addition to forces from the associated pressure responsive unit, said valve mechanism being connected to be operated by hydraulic fluid displaced from said master cylinder, said pressure control valve being connected in the separate line leading to the low pressure motor chamber associated with the other of said pressure responsive units.

7. A mechanism according to claim 4 provided with a pedal operable master cylinder, one of said hydraulic chambers having a space behind the plunger therein connected to said pedal operable master cylinder whereby such plunger will be subjected to master cylinder pressures in addition to forces from the associated pressure responsive unit, said valve mechanism being connected to be operated by hydraulic fluid displaced from said master cylinder, said pressure control valve being arranged in the separate line leading to the low pressure motor chamber associated with the last-mentioned pressure responsive unit.

8. A booster brake mechanism for a motor vehicle having front wheels provided with wheel cylinders and rear tandem drive wheels each provided with wheel cylinders, a first hydraulic chamber communicating with the front wheel cylinders, a second hydraulic chamber communicating with the tandem drive wheel cylinders, a plunger operable in each hydraulic chamber to displace fluid therefrom, a booster motor unit having separate pressure responsive units therein connected to the respective plungers, said motor having a low pressure chamber adjacent each pressure responsive unit and variable pressure chamber means to which the other sides of both pressure responsive units are exposed, a source of high pressure and a source of low pressure, a control valve mechanism connected to said sources and to said motor chambers and connected to normally balance pressures therein, a pedal operable master cylinder, said second hydraulic chamber having behind the plunger therein a hydraulic space communicating with said master cylinder, means connected to be operated by fluid displaced from said master cylinder for operating said valve mechanism for connecting said variable pressure chamber means to said high pressure source, and separately operable pressure control valves connected between said valve mechanism and the respective low pressure chambers of said motor, each pressure control valve having manual operating means including a handle accessible in the driver's compartment of the vehicle to be operated to thereby separately predetermine the maximum pressure to which each of said pressure responsive units can be subjected.

References Cited in the file of this patent

UNITED STATES PATENTS

| | | |
|---|---|---|
| 1,795,319 | Spohr | Mar. 10, 1931 |
| 2,074,718 | Bohannan | Mar. 23, 1937 |
| 2,079,589 | Arbuckle | May 11, 1937 |
| 2,144,020 | Hunt | Jan. 17, 1939 |
| 2,402,344 | Price | June 18, 1946 |
| 2,458,803 | Stelzer | Jan. 11, 1949 |